(No Model.)  2 Sheets—Sheet 1.

A. L. STOVER.
CAR COUPLING.

No. 413,102. Patented Oct. 15, 1889.

Witnesses:
M. L. L. McQueen
M. L. Fisher

Inventor:
Arthur L. Stover
per Wm. Hubbell Fisher
Attorney.

(No Model.) 2 Sheets—Sheet 2.
A. L. STOVER.
CAR COUPLING.
No. 413,102. Patented Oct. 15, 1889.
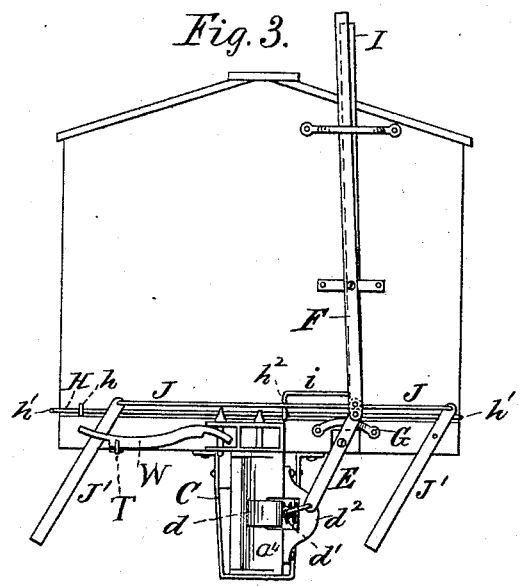
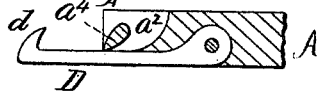
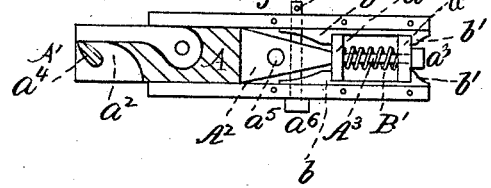
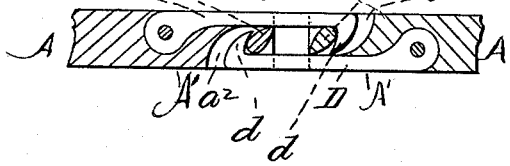
Witnesses:
M. L. L. McQueen
M. L. Fisher
Inventor:
Arthur L. Stover
per Wm. Hubbell Fisher,
Attorney.

UNITED STATES PATENT OFFICE.

ARTHUR L. STOVER, OF HAMILTON, OHIO.

CAR-COUPLING.

SPECIFICATION forming part of Letters Patent No. 413,102, dated October 15, 1889.

Application filed September 15, 1888. Serial No. 285,952. (No model.)

*To all whom it may concern:*

Be it known that I, ARTHUR L. STOVER, a citizen of the United States, and a resident of the city of Hamilton, in the county of Butler and State of Ohio, have invented certain new and useful Improvements in Automatic Car-Couplers, of which the following is a specification.

The several features of my invention and the advantages arising from their use, conjointly or otherwise, will be apparent from the following description.

Figure 1:
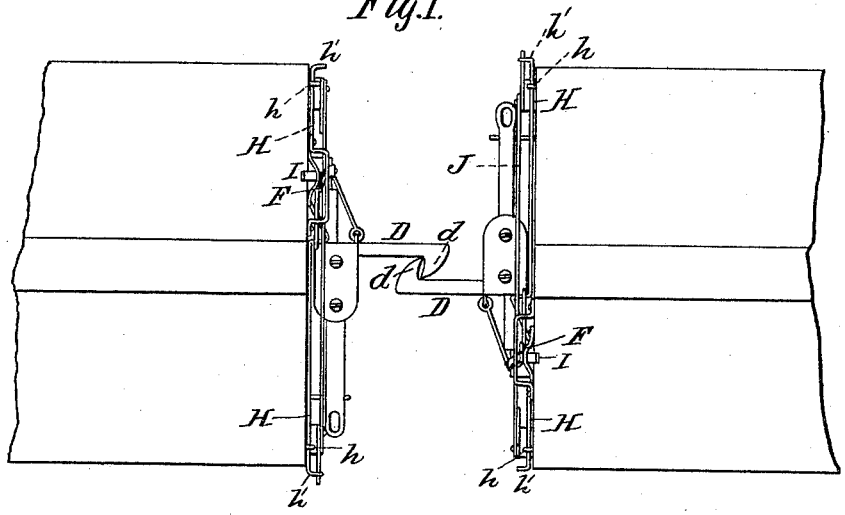
Figure 2:
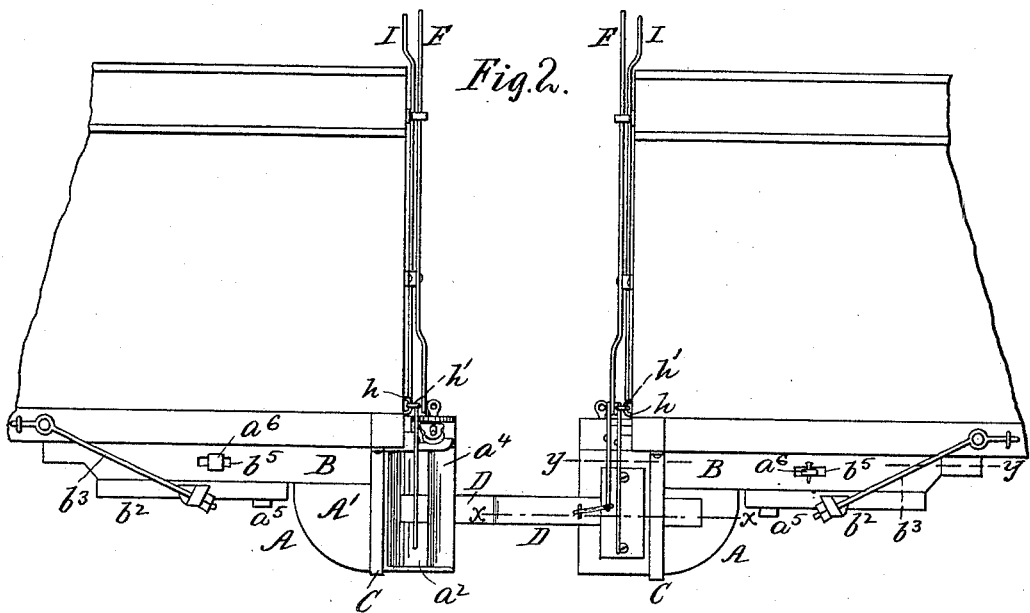

In the accompanying drawings, forming part of this specification, Figure 1 is a top view of the ends of two box-cars provided with my device and shown coupled in one of the two ways possible. Fig. 2 is a side elevation corresponding to the view shown in Fig. 1. Fig. 3 is an end elevation of a box-car provided with my device. Fig. 4 is a section taken at the line $x\ x$, Fig. 2. Fig. 5 is a section taken at the line $y\ y$, Fig. 2. Fig. 6 is a top view of the device for holding the link open and for releasing it. Fig. 7 is a sectional view illustrating the preferred method of coupling.

The draw-head A is received in the guide-box B. Its enlarged head A' is supported by the yoke C. The shank of the draw-head consists of the part $A^2$ immediately behind the head A', and the rod $A^3$, which terminates in the head $a^3$. The rod $A^3$ is surrounded by the spiral spring B', which gets its bearings against the loose collar $a'$ on the rod $A^3$, and which is limited in its backward movement by the shoulders $b'$ of the box B and the loose collar $a$ on the rod $A^3$. The loose collar $a$ gets its bearings against the end of the part $A^2$ of the draw-head, and its forward movement is limited by the shoulders $b$ on the inside of the box B. The space occupied by the spring B' gives the draw-head a certain amount of play. Thus in a thrust the draw-head is forced backward and the spring B' compressed against the collar $a'$, which remains stationary, and when there is a pull the spring is compressed against the collar $a$, which remains stationary while the collar $a'$ is drawn forward. The box B is closed by the bottom $b^2$, which is held to its place by bolts and the rods $b^3$.

As a means of steadying the movement of the draw-head, it is preferably provided with the guide-pin $a^5$, which projects through and moves in a corresponding slot in the bottom $b^2$ of the box B. Lateral guides $a^6$ also project from the draw-head and move in the slots $b^5$. The head A' is enlarged vertically to a considerable extent, and is provided in one lateral face with the vertical recess $a^2$, whose outer edge is closed by the ridge $a^4$, which extends vertically from top to bottom of the head A'. The coupling-bar D is pivoted in the head A' and projects forward in front of it, terminating in the hook extremity $d$. It is preferably received in a groove in the head A', and is held to its place by the spring $d'$, supported by the yoke $d^2$.

Two cars may be coupled by merely interlocking the bars D; or they may be coupled by the hook-head $d$ of the bar D of each car catching over the ridge $a^4$ of the draw-head of the other car. In uncoupling, the bars D are swung laterally far enough to clear the ridges $a^4$. The cars may then be drawn apart. When the bars are released, the springs $d'$ return them to their places.

The preferred form of mechanism for withdrawing the bars D of each car is that shown in the drawings. The lever E is fulcrumed to the body of the car or edge of the platform. Its lower end is attached to the bar D, and its upper end pivoted to the lower end of the uncoupling-lever F. This latter lever is fulcrumed at a convenient point above the lever E and extends upwardly to the top of the car in the case of box-cars, or a less distance in the case of platform or passenger cars. By means of the lever F the bar D may be thrown out of couple. To hold the link in this position, the lever E is provided with the tooth $e$, which in the movement of the lever sweeps over the arc or projecting plate G, attached to the body of the car, and becomes caught behind the shoulder $g$ in the edge of this piece. As a means for releasing the lever E when thus caught, I have provided the bar H, which passes across the edge of the car and is held by suitable guides $h$, which permit it to be moved laterally. It is provided with a handle $h'$ at each end, and with the inclined plane $h^2$ where it passes behind the levers E and F. When the bar H is moved toward the side of the car, the inclined plane $h^2$ gradually raises the tooth $e$ over the shoulder $g$ and permits the spring $d'$ to force the bar D into place.

As a means for operating the bar H from the top of a car, I provide the lever I, which is conveniently placed behind the lever F, and which is provided at its lower end with the hook $i$. The hook $i$ rests behind the inclined plane $h^2$, and consequently by appropriate movement of the lever I the bar H may be moved so as to release the lever E. The rod J is attached to the top of the lever E or bottom of lever F, and extends therefrom to each side of the car, where it connects with the levers J'. These latter, being low down, afford a means, in connection with the bar H, of operating the bar D while standing on the ground and without passing between the cars.

Cars provided with my coupling device may also be provided with the ordinary link-and-pin coupling, as shown in the drawings. I have also shown it provided with the long locomotive coupling-bar W, which in the drawings is shown thrown to one side and supported on a bracket T.

My coupling, besides being very strong, allows of great vertical movement of the coupling, or the coupling of cars having platforms of greatly different elevations. By dispensing with long and bent links the couplings are made closer and much of the jarring and bumping is avoided.

What I claim as new, and desire to secure by Letters Patent, is—

1. The draw-bar A, having enlarged head A', provided with vertical groove $a^2$ and ridge $a^4$, and coupling-bar D, pivoted to the draw-head and provided with hook $d$ and yoke $d^2$, and spring $d'$, substantially as and for the purposes specified.

2. The draw-bar A, having enlarged head A', provided with vertical groove $a^2$ and ridge $a^4$, and coupling-bar D, pivoted to the draw-head and provided with hook $d$ and yoke $d^2$, and spring $d'$, and means for moving the bar D laterally, substantially as and for the purposes specified.

3. The combination of a car-body, box B, provided with shoulders $b\ b'$, draw-bar having shank $A^2$, provided with pins $a^5$ and $a^6$, projecting through the box B, and rod $A^3$, the latter having head $a^3$, collars $a\ a'$ on rod $A^3$, and spring B' between collars $a\ a'$, substantially as and for the purposes specified.

4. The combination of a car-body, box B, provided with shoulders $b\ b'$, draw-bar having vertically-enlarged head A', provided with groove $a^2$ and ridge $a^4$, having shank $A^2$ and rod $A^3$, the latter having head $a^3$, collars $a\ a'$ on rod $A^3$, and spring B' between collars $a\ a'$, and coupling-link D, pivoted to the draw-bar and having hook $d$, substantially as and for the purposes specified.

5. The combination of a car, draw-bar, coupling-bar, lever E, attached to the coupling-bar, and lever F, for operating lever E, substantially as and for the purposes specified.

6. The combination of a car, draw-bar, coupling-bar, lever E, attached to the coupling-bar, and rod J and levers J', for operating lever E, substantially as and for the purposes specified.

7. The combination of a car, draw-bar, coupling-bar, lever E, having tooth $e$, arc G, having shoulder $g$, and lever F, for operating lever E, substantially as and for the purposes specified.

8. The combination of a car, draw-bar, coupling-bar, and having tooth $e$, arc G, having shoulder $g$, lever E, attached to the coupling-bar, and rod J and levers J', for operating lever E, substantially as and for the purposes specified.

9. The combination of a car, draw-bar, coupling-bar, lever E, attached to the coupling-bar, and lever F, for operating lever E, and bar H, having inclined plane $h^2$ and handles $h'$, substantially as and for the purposes specified.

10. The combination of a car, draw-bar, coupling-bar, lever E, attached to the coupling-bar, and lever F, for operating lever E, bar H, having inclined plane $h^2$ and handles $h'$, and lever I, having hook $i$, catching behind the inclined plane $h^2$, substantially as and for the purposes specified.

11. The combination of a car, draw-bar, coupling-bar, yoke $d^2$, and spring $d'$, lever E, attached to the coupling-bar, and lever F, for operating lever E, and bar H, having inclined plane $h^2$ and handles $h'$, substantially as and for the purposes specified.

12. The combination of a car, draw-bar, coupling-bar D, yoke $d^2$, spring $d'$, lever E, attached to the coupling-bar, lever F, rod J, levers J', bar H, having inclined plane $h^2$ and handles $h'$, and lever I, having hook $i$, substantially as and for the purposes specified.

13. The combination of a car, draw-bar, coupling-bar, lever E, attached to the coupling-bar, and rod J and levers J', for operating lever E, and bar H, having inclined plane $h^2$ and handles $h'$, substantially as and for the purposes specified.

14. The combination of a car, draw-bar, coupling-bar, lever E, attached to the coupling-bar, and rod J and levers J', for operating lever E, bar H, having inclined plane $h^2$ and handles $h'$, and lever I and hook $i$, catching behind the inclined plane $h^2$, substantially as and for the purposes specified.

15. The combination of a car, draw-bar, coupling-bar, yoke $d^2$, and spring $d'$, lever E, attached to the coupling-bar, and rod J and levers J', for operating lever E, and bar H, having inclined plane $h^2$ and handles $h'$, substantially as and for the purposes specified.

ARTHUR L. STOVER.

Attest:
  A. L. HERRLINGER,
  G. A. W. PAVER.